(12) United States Patent
Goss (10) Patent No.: US 7,454,164 B2
(45) Date of Patent: Nov. 18, 2008

(54) PROVIDING A MULTIMEDIA MESSAGE WITH A MULTIMEDIA MESSAGING SERVICE MESSAGE IN A MOBILE ENVIRONMENT

(75) Inventor: Jim Goss, Dundrum (IE)

(73) Assignee: Lucent Technologies Inc., Murray Hill, NJ (US)

( * ) Notice: Subject to any disclaimer, the term of this patent is extended or adjusted under 35 U.S.C. 154(b) by 569 days.

(21) Appl. No.: 11/024,180

(22) Filed: Dec. 28, 2004

(65) Prior Publication Data

US 2006/0141923 A1   Jun. 29, 2006

(51) Int. Cl.
*H04Q 7/20* (2006.01)
(52) U.S. Cl. .................. 455/3.01; 455/3.03; 455/412.1; 455/412.2
(58) Field of Classification Search ................ 455/3.01, 455/426, 445, 403, 3.03, 446, 412, 456, 404, 455/3.04, 552.1, 566, 412.1, 412.2
See application file for complete search history.

(56) References Cited

U.S. PATENT DOCUMENTS

| | | | | |
|---|---|---|---|---|
| 6,381,465 | B1 * | 4/2002 | Chern et al. | 455/466 |
| 2002/0026360 | A1 * | 2/2002 | McGregor et al. | 705/14 |
| 2002/0137507 | A1 * | 9/2002 | Winkler | 455/426 |
| 2003/0134648 | A1 * | 7/2003 | Reed et al. | 455/456 |
| 2004/0176024 | A1 * | 9/2004 | Hsu et al. | 455/3.04 |
| 2005/0010573 | A1 * | 1/2005 | Garg | 707/10 |
| 2007/0093201 | A1 * | 4/2007 | Hsu et al. | 455/3.04 |
| 2007/0202922 | A1 * | 8/2007 | Myllynen et al. | 455/566 |

OTHER PUBLICATIONS

International Search Report for EP05257713.7 dated Mar. 21, 2006.

* cited by examiner

*Primary Examiner*—Tan Trinh (57) ABSTRACT

The present invention provides a method and an apparatus for communicating a multimedia messaging service message from a source mobile device to a target mobile device in a telecommunications network. The method comprises receiving a request for a multimedia message and associating the multimedia message to the multimedia messaging service message. The multimedia messaging service message along with the associated multimedia message may be provided for transmission to the target mobile device. For example, an advertisement from a gateway associated with a telecommunication company network may be appended to a multimedia messaging service message as an add-on multimedia messaging service message. An engine may determine content of the appended add-on multimedia messaging service message based on a profile for an end-user and a subscriber profile of an advertising service. A database may store a record of a call to provide information including billing data to one or more concerned parties. In this way, instead of short text messages, using extensible Markup Language and Internet protocol, additional multimedia messaging service messages, such as pictures, and/or audio, video streams may be appended with an existing multimedia messaging service message.

6 Claims, 4 Drawing Sheets

PROVIDING A MULTIMEDIA MESSAGE WITH A MULTIMEDIA MESSAGING SERVICE MESSAGE IN A MOBILE ENVIRONMENT

BACKGROUND OF THE INVENTION

1. Field of the Invention

This invention relates generally to telecommunications, and more particularly, to wireless communications.

2. Description of the Related Art

As use of hand-held or portable communication devices, such as mobile phones, continues to grow, new value added services are being launched by many vendors and network operators. For example, with a rapid demand in wireless traffic, a host of messaging services have become successful over time. A messaging service may use an engine underlying an electronic messaging system that allows users to inset tailored messages and enable customization of these messages. A wide array of messaging service related technologies have been developed. As a result, a large number of vendors and network operators have rapidly deployed messaging service centers.

One type of popular messaging service is referred to as a Short Message Service (SMS), which is a two-way wireless alphanumeric text messaging service that enables short text messages, such as generally no more than 160 characters in length to be received at and transmitted from a mobile or cell phone. SMS may be provided in a variety of digital mobile communications systems. In Code Division Multiple Access (CDMA) systems, SMS messages are controlled by a standard described in TIA/EIA-637-A. Digital cellular phones, such as Global System for Mobile (GSM) communication phones, can also send and receive SMS messages. SMS messages may be stored and forwarded at SMS centers for later retrieval if a mobile or cell phone user is not immediately available. SMS messages travel to the mobile or a cell phone over the communications system's control channel, which is separate and apart from the voice channel.

Using an SMS to Application Gateway (SAG), a SMS message may be delivered to a user on a digital network via a network operator's message center or Internet. For example, an SMS text message may use gateways that exchange Signaling System 7 (SS7) messages. An SS7 message generally refers to a signaling or an addressing protocol that performs call processing when routing traffic for circuit switched services that provide out-of-band signaling on a high speed signaling backbone for a public switched telephone network (PSTN).

Another type of messaging is Multimedia Messaging Service (MMS). As defined by Third Generation Project Partnership (3GPP) and Wireless Application Protocol (WAP) Forum, a standard for accessing the Internet with wireless devices, e.g., mobile phones, MMS is a messaging service for a mobile environment very similar to SMS, or text messaging. For example, an MMS message may include text, a picture and an audio object. Specifically, an MMS service provides an automatic, immediate delivery of personal multimedia messages from a phone-to-phone or from a phone to an e-mail client. Thus, MMS is a type of messaging within mobile networks that extends SMS.

To provide MMS type messaging, the wireless or mobile network operators or service providers may not only have to integrate new infrastructure elements, but the end users may need to have mobile phones that support MMS. In addition to the familiar text content of text messages, MMS messages may comprise images, graphics, voice, audio clips, and the like.

As SMS traffic continues to grow, new value added services are being launched by many vendors and network operators as their SS7 networks have become congested. However, enhanced messaging and other SMS based services are putting more pressure on signaling networks. For example, MMS traffic demands even relatively more complex signaling solutions than the SMS traffic. Many service providers or vendors and network operators that offer real-time SMS services generally sell prepaid charging solutions based on text messages to market. However, MMS messages have different types of messages, such as pictures, audio, video streams.

The present invention is directed to overcoming, or at least reducing, the effects of, one or more of the problems set forth above.

SUMMARY OF THE INVENTION

In one embodiment of the present invention, a method is provided for communicating a multimedia messaging service message from a source to a target mobile device in a telecommunications network. The method comprises receiving a request for a multimedia message, associating the multimedia message to the multimedia messaging service message and providing the multimedia messaging service message with the associated multimedia message for transmission to the target mobile device.

In another embodiment, a processor-based system associated with a network comprises a controller, an interface to enable a user to create a profile for an end-user of a messaging service and to create a subscriber profile of an advertising service and a storage coupled to the controller. The storage may store instructions that the controller may execute to receive a request for an add-on multimedia messaging service message when communicating a multimedia messaging service message from a source mobile device to a target mobile device on the network. The instructions may cause appending of the add-on multimedia messaging service message to the multimedia messaging service message. The multimedia messaging service message may be provided with the appended add-on multimedia messaging service message for transmission to the target mobile device.

In yet another embodiment, a communications system comprises a telecommunication company network to enable a messaging service for an end-user that communicates a multimedia messaging service message from a source mobile device to a target mobile device. The communications system further comprises a gateway communicatively coupled to the telecommunication company network. The gateway may receive a request for an advertisement from a caller on the source mobile device and send the multimedia messaging service message to the target mobile device. A server may be communicatively coupled to the gateway. The server may include an engine to determine content of the appended add-on multimedia messaging service message based on a profile for an end-user and a subscriber profile of an advertising service. A database may be coupled to the engine to store a call detail record of a particular telephone call. The call detail record may provide information including billing data to one or more concerned parties for the appended add-on multimedia messaging service message.

In still another embodiment, an article comprising a computer readable storage medium storing instructions that, when executed cause a system to receive a request for an add-on multimedia messaging service message when communicating a multimedia messaging service message from a source mobile device to a target mobile device on a telecommunications network, append the add-on multimedia messaging service message to the multimedia messaging service message and provide the multimedia messaging service message with the appended add-on multimedia messaging service message for transmission to the target mobile device.

In one further embodiment, an apparatus is provided for communicating a multimedia messaging service message from a source mobile device to a target mobile device in a telecommunications network. The apparatus comprises means for receiving a request for a multimedia message, means for associating the multimedia message to the multimedia messaging service message and means for providing the multimedia messaging service message with the associated multimedia message for transmission to the target mobile device.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it should be appreciated that such a development effort might be complex and time-consuming, but may nevertheless be a routine undertaking for those of ordinary skill in the art having the benefit of this disclosure.

Generally, a method and an apparatus is provided for communicating a multimedia messaging service (MMS) message from a source to a target mobile device in a communications network. The method comprises receiving a request for a multimedia message and associating the multimedia message to the MMS message. The MMS message along with the associated multimedia message may be provided for transmission to the target mobile device. For example, an advertisement from a gateway associated with a telecommunication company (TELCO) network may be appended to an existing MMS message as an add-on MMS message. An engine may determine content of the appended add-on MMS message based on a profile for an end-user and a subscriber profile of an advertising service. A database may store a record of a call to provide information including billing data to one or more concerned parties. In this way, instead of short text messages, using eXtensible Markup Language and Internet protocol, additional MMS messages, such as pictures, and/or audio, video streams may be appended with an existing MMS message. Many advertisers may choose to pay an operator of a TELCO network for appending one or more advertisements, resulting in a substantially large advertisement revenue.

Figure 1:
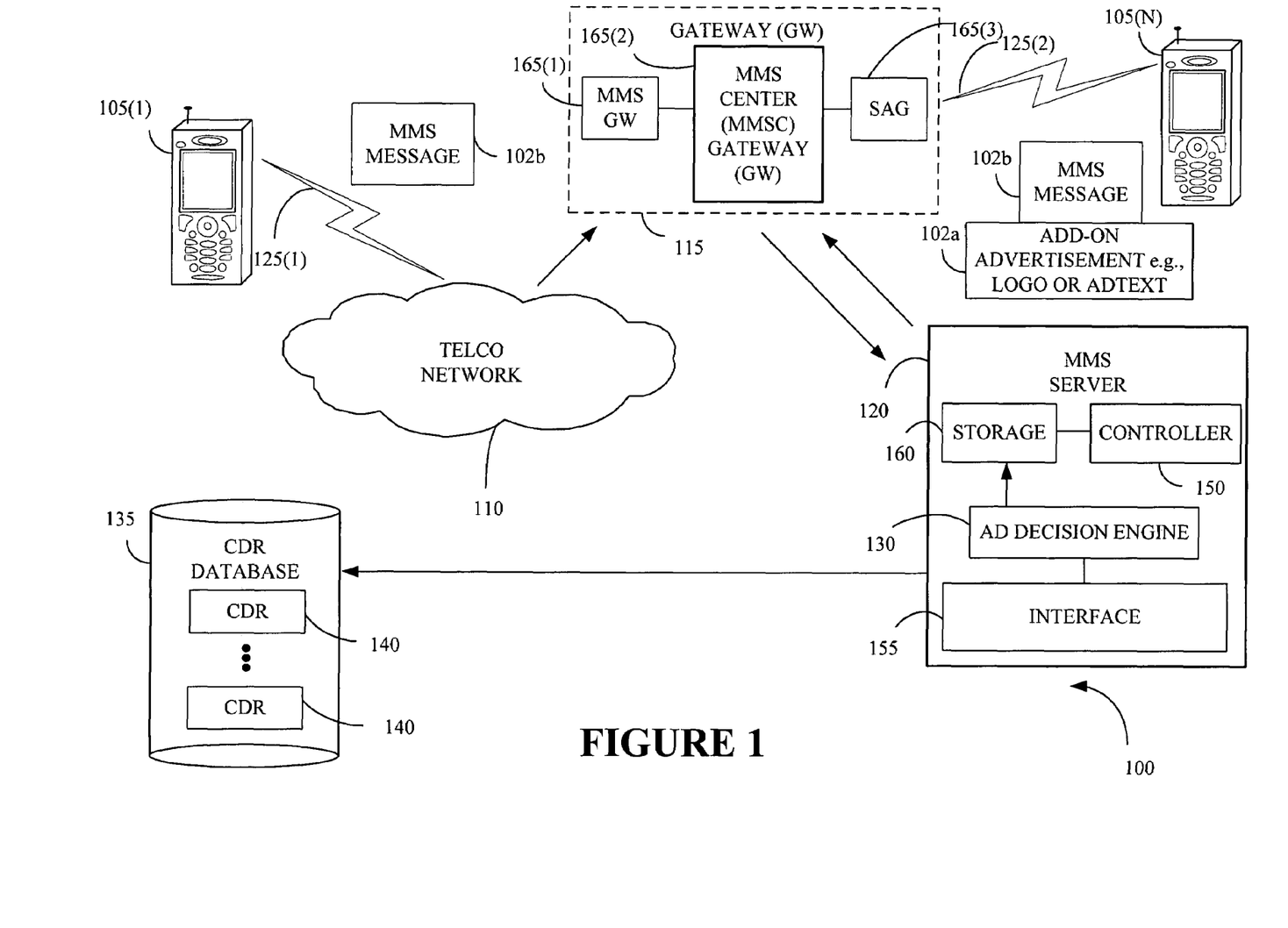
FIG. 1 shows a wireless communications system, in accordance with one embodiment of the present invention.

Referring to FIG. 1, a wireless communications system 100, in accordance with one embodiment of the present invention, for a Multimedia Messaging Service (MMS) may associate an extra message, such as a multimedia message 102a including an advertisement to another multimedia messaging service message 102b. Generally, the MMS is a messaging service for a mobile environment that provides an automatic, immediate delivery of multimedia messages from a phone to another phone or from a phone to an electronic mail (e-mail) including, but not limited to, images, graphics, voice, and audio clips. For example, an advertisement may be appended to the MMS message 102b as an add-on multimedia messaging service message. In this way, instead of short text messages, additional MMS messages comprising pictures, and/or audio, video streams may be appended with an existing multimedia messaging service message.

Examples of the wireless communications system 100 of FIG. 1 include a Universal Mobile Telecommunication System (UMTS), although it should be understood that the present invention may be applicable to other systems that support data and/or voice communication. It should be understood, however, that the configuration of the wireless communications system 100 of FIG. 1 is exemplary in nature, and that fewer or additional components may be employed in other embodiments of the wireless communications system 100 without departing from the spirit and scope of the instant invention. For example, any desirable number of communication devices may be included in the wireless communications system 100.

In some embodiments, the wireless communications system 100 includes a source mobile device 105(1) that intends to communicate with a target mobile device 105(N). Each mobile device 105 may be a cellular telephone or any other wireless-communication enabled device including a personal or desktop computer (PC), a laptop computer or a server, a personal data assistant (PDA), and the like. The wireless communications system 100, in one embodiment, may further comprise a network, such as a telecommunication company (TELCO) network 110 coupled to a gateway (GW) 115 which may provide an access point for the source mobile devices105(1) when communicating with the target mobile device 105(N). The TELCO network 110 may be defined at least in part by a Universal Mobile Telecommunication System (UMTS) protocol. That is, in one embodiment, the TELCO network 110 may enable a messaging service for an end-user that communicates the MMS message 102b from the source mobile device 105(1) to the target mobile device 105(N). The gateway 115 may be communicatively coupled to the TELCO network 110 to receive a request for an advertisement from a caller on the source mobile device 105(1) and send the MMS message 102b to the target mobile device 105(N).

Using a wireless link 125 (1-2), the source and the target mobile devices 105(1-N) may communicate over the TELCO network 110 via the gateway 115. To this end, the gateway 115 may be coupled to a processor-based system, for example, a MMS server 120 so that the source and the target mobile devices 105(1-N) may communicate. Specifically, the MMS server 120 may enable a messaging service over a wireless medium in a mobile environment. Consistent with common usage in the pertinent art, the TELCO network 110, the gateway 115 and the MMS server 120 will be referred to hereinafter as the mobile environment.

The MMS server 120 may comprise an engine, such as an advertisement (AD) decision engine 130 that determines content of the appended add-on MMS message 102a. The wireless communications system 100 may further comprise a database 135 that may be coupled to the engine 130 to store a record, such as a Call Detail Record (CDR) 140 of a call from the source mobile device 105(1) to the target mobile device 105(N). The record may provide information including billing data to one or more concerned parties for the appended add-on MMS message 102a. The CDR 140 may describe a particular telephone call. The CDR 140 may comprise caller information and call destination information for the purposes of billing. The CDR 140 may also include information about the called and calling numbers, call duration, carrier, and a type of a call.

For example, the CDR 140 may include call data generated by a PBX in the form of an ASCII file that includes records of outgoing and incoming calls, who made or received the calls, incoming and outgoing locations of the calls, call length; time call took place and other relevant pieces of information. Typically, the CDR 140 refers to a set of Signaling System 7 (SS7) messages that record data of switches for each call attempt. The CDR database 135 may store CDR data as data packets. A SS7 message enables a common-channel signaling system to use the stored CDR data for determining costs between carriers as well as to calculate a bill for an end-user and an advertiser.

The MMS server 120 may further comprise a controller 150, an interface 155 to enable a user to create a profile for an end-user of a messaging service and to create a subscriber profile of an advertising service. Besides the controller 150 and the interface 155, the MMS server 120 may include a storage 160 coupled to the controller 150. The storage 160 may store and/or receive instructions that the controller 150 may execute to receive a request for the add-on MMS message 102a when communicating the MMS message 102b from the source mobile device 105(1) to the target mobile device 105(N) on the TELCO network 110. The gateway 115 associated with the TELCO network 110 may receive the request for an advertisement from a caller on the source mobile device 105(1) and send the MMS message 102b to the target mobile device 105(N).

Accordingly to one exemplary embodiment of the instant invention, the add-on MMS message 102a may be appended to the MMS message 102b, in response to the request from the gateway 115, on behalf of the user of the messaging service that is available at the source mobile device 105(1). In this manner, the engine 130 associated with the MMS server 120 may provide the MMS message 102b with the appended add-on MMS message 102a to the gateway 115 for transmission to the target mobile device 105(N).

Consistent with some embodiments of the present invention, the gateway 115 may comprise a MMS gateway (GW) 165(1) to communicate with the TELCO network 110 and a MMS center (MMSC) gateway (GW) 165(2) coupled to the MMS gateway 165(1) to communicate with the engine 130. The gateway 115 may further comprise a short message service to application gateway (SAG) coupled to the MMSCGW 165(2) to communicate with the target mobile device 105(N).

In operation, an advertisement from the gateway 115 that is associated with the TELCO network 110 may be appended to the MMS message 102b as the add-on MMS message 102a. To associate the MMS message 102a, the MMS message 102b may be intercepted in the gateway 115. Thereafter, for example, appending an advertisement may be appended to the intercepted MMS message 102b as the add-on MMS message 102a. In this way, instead of short text messages (SMSs), using extensible Markup Language (XML) and Internet protocol (IP), additional MMS messages for advertisements including a logo or an AD text, such as pictures or images, and/or audio, video data or streams may be added, attached, associated with an existing MMS message, such as the MMS message 102b.

More particularly, the engine 130 may determine content of the appended add-on MMS message 102a based on a profile for an end-user and a subscriber profile. While the profile for an end-user may incorporate personal interest and/or demographic information, the subscriber profile may classify personal interest and/or demographic information in one or more groups. A subscriber may subscribe to the advertising service using a host of ways, such as by sending a short SMS message, calling a call center, via a web-page interface, or the like.

Using the engine 130, for an end-user of a messaging service, a profile may be created and a subscriber profile may be created for an advertising service. Without deviating form the spirit of the present invention, a media broker may create demographic and/or interest groups of users. For focused advertising, i.e., to selectively reach a focused audience, advertisements may be created by combining interests and/or demographics of users of a messaging service. When an advertisement is sent, a billing record may record that a particular media broker has been used.

To send different types of advertisements, several different sizes of messages and/or different length of advertisements may be created. However, a decision as to whether or not to advertise and a nature of such an advertisement may rest with the engine 130 and be based on at least one of the profile for an end-user and the subscriber profile for an advertising service. That is, each subscriber, such as a company or agency of the advertising service may provide a selection criterion for an advertisement to the engine 130. For example, the selection criterion may comprise a count, a premium rate, a particular timing at which the advertisement may be selected for transmission.

Figure 2:
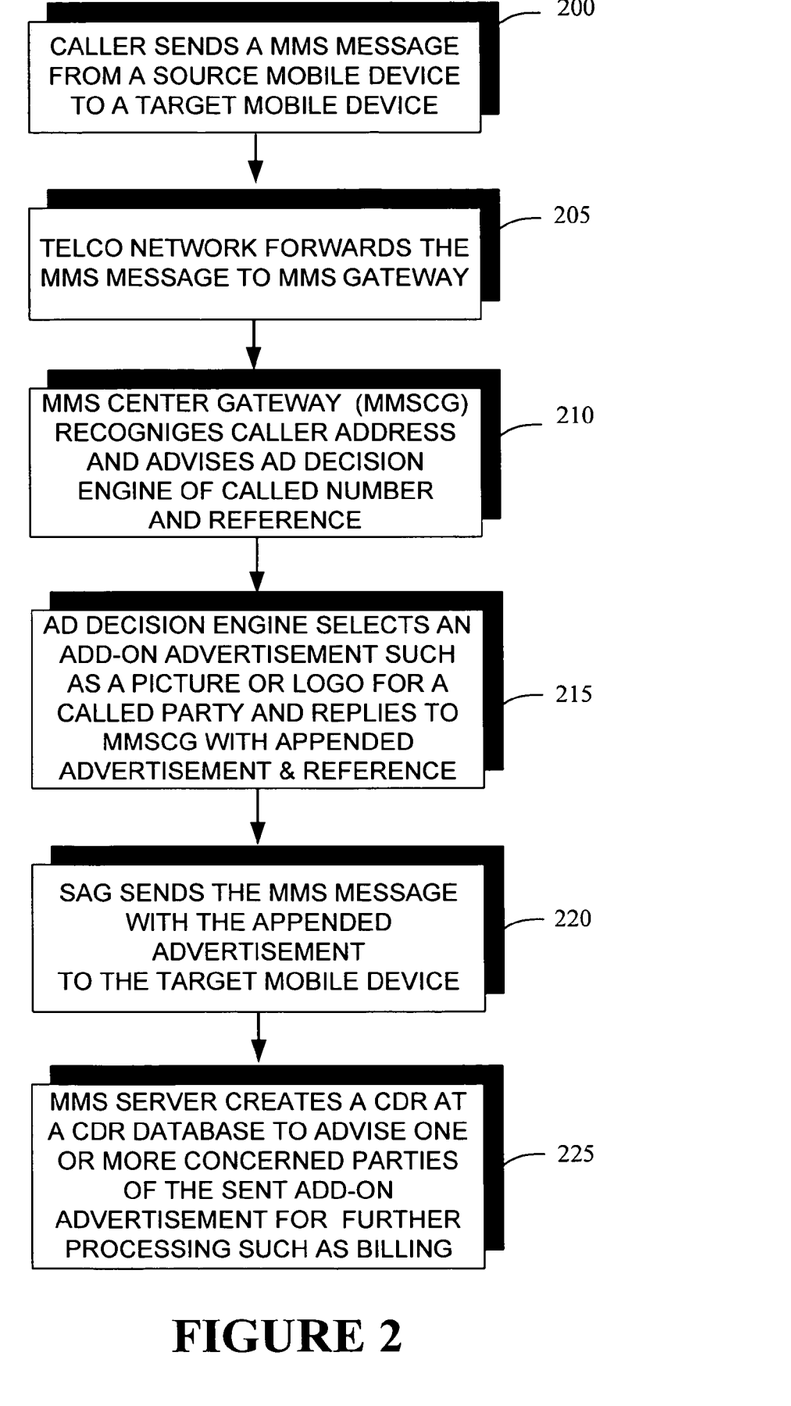
FIG. 2 schematically depicts a method for communicating a multimedia messaging service message from a source mobile device to a target mobile device in a telecommunications network according to one embodiment of the present invention.

Turning now to FIG. 2, a method is schematically depicted for communicating the MMS message 102b from the source mobile device 105(1) to the target mobile device 105(N) in the TELCO network 110, according to one illustrative embodiment of the present invention. At block 200, when a caller sends the MMS message 102b, the MMS server 130 may cause the TELCO network 110 to forward thereof to the MMS gateway 165(1), as shown at block 205.

The MMSCGW 165(2) may receive a called number and a reference indication for the MMS message 102b, in various embodiments of the instant invention. The MMSCGW 165(2) may recognize a caller address, and in turn, advise the engine 130 of the called number and the reference indication, at block 210.

For a called party, at block 215, the engine 130 may select an add-on advertisement, such as at least one of a picture and a logo of the add-on advertisement to be sent with the MMS message 102b. Using one or more characteristics of the MMS message 102b and a profile of the add-on advertisement, the engine 130 may decide whether or not to append the MMS message 102a with the MMS message 102b for the called party. As indicated at the block 215, the engine 130 may further reply to the gateway 115 with the appended add-on advertisement including the picture and/or the logo and the reference indication.

The SAG 165(3) at block 220 may send to the target mobile device 105(N) the MMS message 102b along with the appended add-on advertisement, i.e., the MMS message 102a. At block 225, the MMS server 120 may create a record, such as the CDR 140 for describing a particular telephone call to one or more concerned parties that have interest in at least one of the source and the target mobile device 105(1-N) and the appended add-on advertisement logo and/or picture. The database 135 may process the record of the particular telephone call to determine billing information for the appended add-on MMS message 102a.

The database 135 may maintain each advertisement in a database of advertisements. The engine 120 may enable a user to develop a subscriber database of an advertising service and a user group database associated with each advertising entity of the subscriber database of an advertising service. The database 135 may further record information associated with the database of advertisements, the subscriber database of an advertising service and the user group database corresponding to the MMS message 102b.

Figure 3:
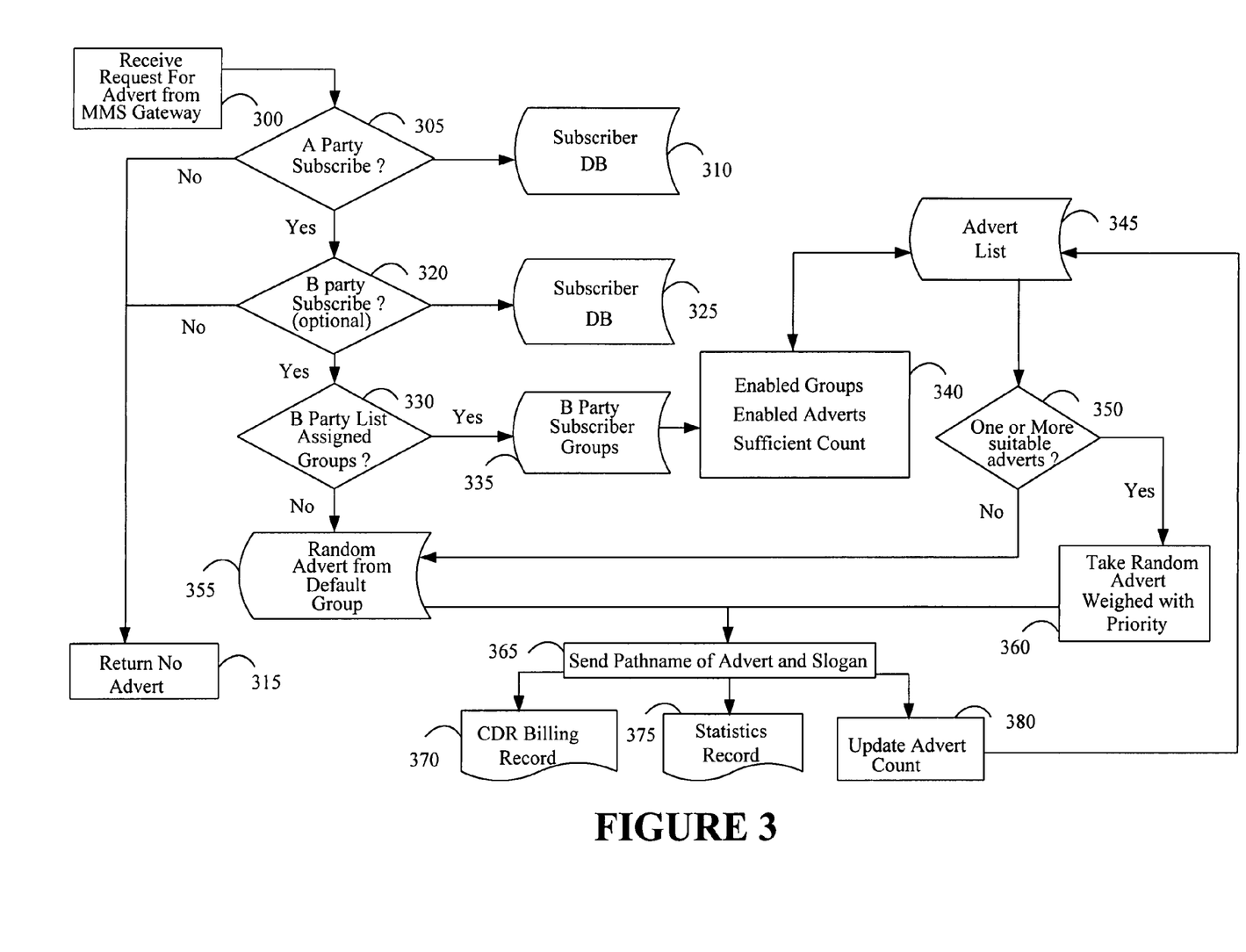
FIG. 3 schematically depicts a method of associating a multimedia message to a multimedia messaging service message to provide the multimedia messaging service message with the associated multimedia message for transmission to a target mobile device consistent with one embodiment of the present invention.

As shown, FIG. 3 schematically depicts a method of associating another multimedia message to an existing MMS message to provide the MMS message 102b with the associated MMS message 102a for transmission to the target mobile device 105(1) consistent with one embodiment of the present invention. At block 300, the engine 130 may receive a request for an advertisement (ADVERT) from the MMS gateway 165(1). A check at a decision block 305 may ascertain whether or not a party A is a subscriber of an advertising service. That is, a first subscriber database (DB) 310 may be checked to determine if there is a need to return an advertisement. If the party A turns out to be a non-subscriber, no ADVERT is returned at block 315. However, optionally, if the party A is a subscriber, a test may be conducted at a decision block 320 to determine whether or not another party B is a subscriber of the advertising service. A second subscriber database (DB) 325 may be searched for this purpose.

At a decision block 330, a check may indicate one or more assigned groups for a list of the party B. To this end, the check may provide for one or more party B subscriber groups at block 335. For example, one or more enabled groups, one or more enabled advertisements (ADVERTs) and a count may be indicated to be available at block 340. An advertisement list may be accessed at block 345. A test as to an availability of one or more suitable advertisements may be undertaken at block 350. When, not a single suitable advertisement is found at the block 350, and there are no party B list assigned groups indicated at the block 330, the engine 130 may randomly pick an advertisement from a default group, as shown in block 355. However, if one or more suitable advertisements are indicated to available at the block 350, a random advertisement may be weighed with a priority at block 360.

At block 365, the engine 130 may send a pathname of an advertisement and an associated slogan therewith. At block 370, he pathname of the advertisement may generate a CDR billing record in the database 135 shown in FIG. 1. Any desired statistics, for this advertisement, may be recoded at block 375. A count for the advertisement may be updated at block 380 in some embodiments. This update of the advertisement count may be indicated in the advertisement list at block 345.

Figure 4:
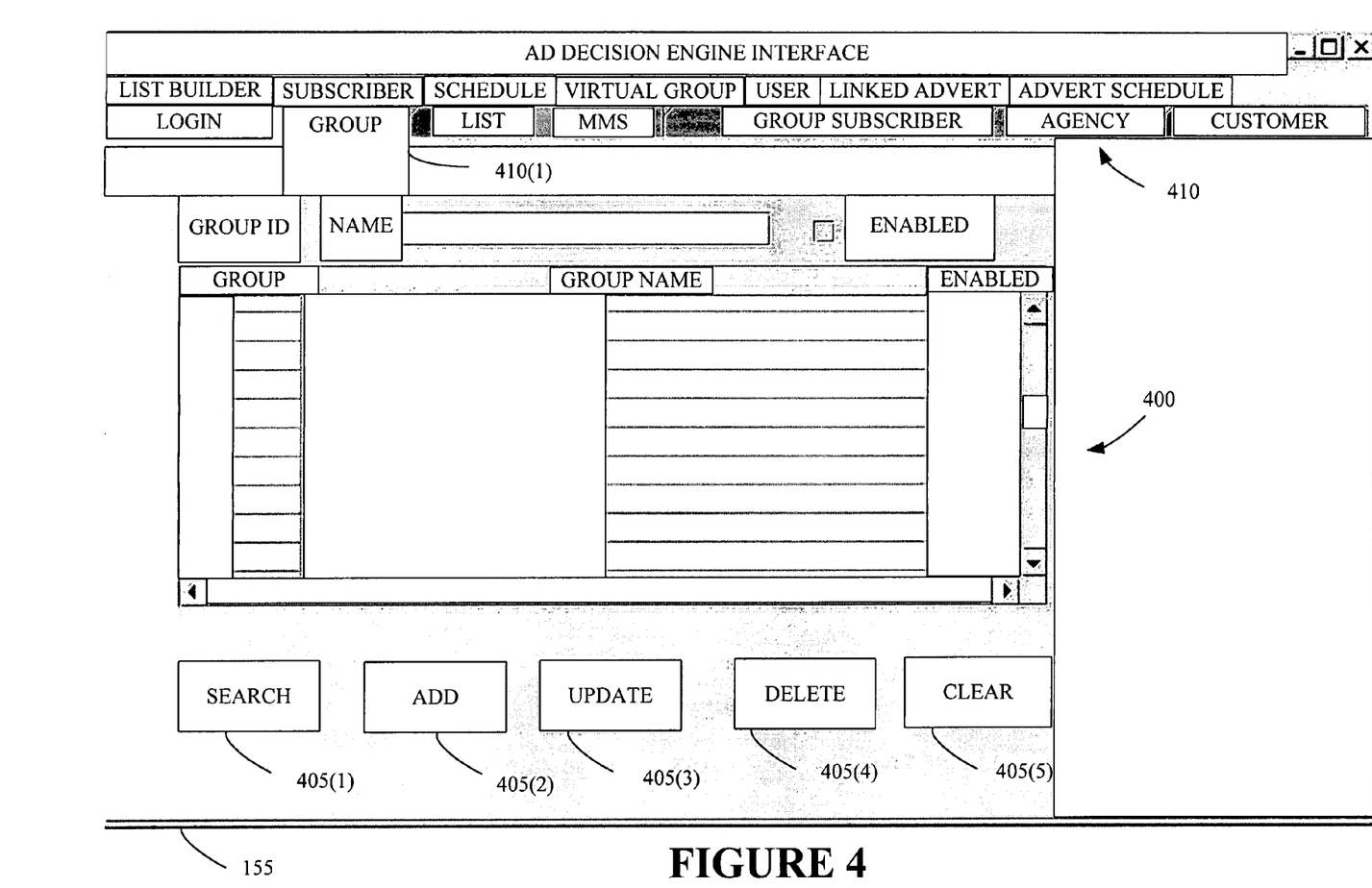
FIG. 4 is a stylistic representation of an interface for an engine that determines content of an appended add-on multimedia messaging service message based on a profile for an end-user and a subscriber profile in the wireless communications system of FIG. 1 according to one embodiment of the present invention.

Finally, FIG. 4 shows a stylistic representation of the interface 155 for the engine 130 that determines content of the appended add-on MMS message 102a based on a profile for an end-user and a subscriber profile in the wireless communications system 100 of FIG. 1 according to one embodiment of the present invention. Essentially, the interface 155 provides a plurality of fields 400 accessible via a user interface, such as a conventional Graphical user Interface (GUI) to create the profile for an end-user and the subscriber profile of the advertising service. Examples of these fields 400 include, but are not limited to, a group field, a group name field, an enabled/disabled field, a group ID field, a name field for a group. For this purpose, the interface 155 may provide a multiplicity of buttons, such as a search button 405(1), an add button 405(2), an update button 405(3), a delete button 405(4), and a clear button 405(5).

Additionally, the interface 155 may comprise a number of templates 410. For example, a group template 410(1) is shown to include a group field, a group name field, an enabled/disabled field, a group ID field, a name field. Examples of the templates 410 include, but are not limited to, a login template, a list template, a MMS template, a group subscriber template, an agency template, a customer template, a list builder template, a subscriber template, a schedule template, a virtual group template, a user template, a linked ADVERT template, an ADVERT schedule template.

By appending one or more extra MMS messages on the end of an existing MMS message, the engine 130 may a revenue stream from advertisers paying for slogans and/or logos to be appended on the end of a MMS picture message, in some embodiments. When a caller sends an MMS message, such as a picture or video message from a picture or vision-enabled mobile phone, available transmission capacity may be used for sending of the picture or video message. The wireless communications system 100 shown in FIG. 1 may intercept the picture or video message as it passes to the MMS gateway 165(1) and append a tailored advertisement or a slogan/logo onto the end thereof.

For example, the MMS message 102b may be sent in XML format which allows appending of extra fields that include additional MMS messages. An additional field of a tailored slogan/logo for a party, such as the Party B (sending number) may be added onto the end of the MMS message. By adding on a logo or an advertisement on the end of a MMS message, i.e., the MMS message 102b, the commercial "value" of a message may be significantly increased. Therefore, many advertisers may choose to pay an operator of the TELCO network 110 for appending one or more advertisements on the end of the MMS message 102b, resulting in a substantially large advertisement revenue.

Portions of the present invention and corresponding detailed description are presented above in terms of software, or algorithms and symbolic representations of operations on data bits within a storage device or a semiconductor memory associated with a computing device, such as a computer or controller. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computing system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A method for communicating a multimedia messaging service message from a source mobile device to a target mobile device in a telecommunications network, the method comprising:

receiving a request for a multimedia message, wherein receiving the request comprises receiving a request for an advertisement from a gateway associated with said telecommunications network;

associating said multimedia message with said multimedia messaging service message, associating said multimedia message farther comprises:

intercepting said multimedia messaging service message in said gateway; and appending said advertisement to said intercepted multimedia messaging service message as an add-on multimedia messaging service message, wherein appending said advertisement further comprising:

receiving a called number and a reference indication for said multimedia messaging service message;

selecting at least one of a picture and a logo of said advertisement for a called party; and replying to said gateway with the appended add-on multimedia messaging service message including said at least one of a picture and a logo and said reference indication; and providing said multimedia messaging service message with the associated multimedia message for transmission to said target mobile device; and in response to transmission of the appended add-on multimedia messaging service message to said target mobile device, creating a record for describing a particular telephone call to one or more concerned parties that have interest in at least one of said source mobile device and said target mobile device and the appended add-on multimedia messaging service message.

2. A method, as set forth in claim 1, wherein creating a record further comprising:

processing said record of said particular telephone call to determine billing information for the appended add-on multimedia messaging service message.

3. A method, as set forth in claim 2, further comprising:
providing an interface to create a profile for an end-user of a messaging service and to create a subscriber profile of an advertising service.

4. A method, as set forth in claim 3, further comprising:
determining content of the appended add-on multimedia messaging service message based on said profile for an end-user and said subscriber profile.

5. A method, as set forth in claim 2, further comprising:
using one or more characteristics of said multimedia messaging service message and a profile of said advertisement to decide whether or not to append said multimedia message with said multimedia messaging service message for said called party.

6. A method, as set forth in claim 2, further comprising:
maintaining said advertisement in a database of advertisements; and developing a subscriber database of an advertising service and a user group database associated with each advertising entity of said subscriber database of an advertising service; and recording information associated with said database of advertisements, said subscriber database of an advertising service and said user group database corresponding to said multimedia messaging service message.

* * * * *